United States Patent [19]

Wanson

[11] 4,251,324
[45] Feb. 17, 1981

[54] INSTALLATION FOR PURIFICATION OF A LIQUID COMPOUND

[75] Inventor: Leon J. Wanson, Brussels, Belgium

[73] Assignee: Etablissements Wanson, Construction de Materiel Thermique, Brussels, Belgium

[21] Appl. No.: 966,559

[22] Filed: Dec. 5, 1978

[51] Int. Cl.³ .............................................. B01D 1/26
[52] U.S. Cl. .................................. 202/174; 159/17 P
[58] Field of Search ............ 202/174; 159/17 R, 17 P, 159/17 VS, 17 C, 19, 20 R; 203/25, 26, 27

[56] References Cited

U.S. PATENT DOCUMENTS 3,494,836  2/1970  Standiford .......................... 202/174
3,941,663  3/1976  Steinbruchel ........................ 202/174

Primary Examiner—Frank Sever
Attorney, Agent, or Firm—Young & Thompson

[57] ABSTRACT

Multi-stage purification installation offering a great flexibility in the treatment of the residues produced and involving a relatively low energy consumption. Each stage comprises two heat exchangers connected in series and is fed independently with the liquid compound to be treated. At the outlet of each stage there is produced a polyphase mixture which is then separated into vaporized component(s) and sludges, the vaporized component(s) serving as heating fluid in the next following stage.

9 Claims, 1 Drawing Figure

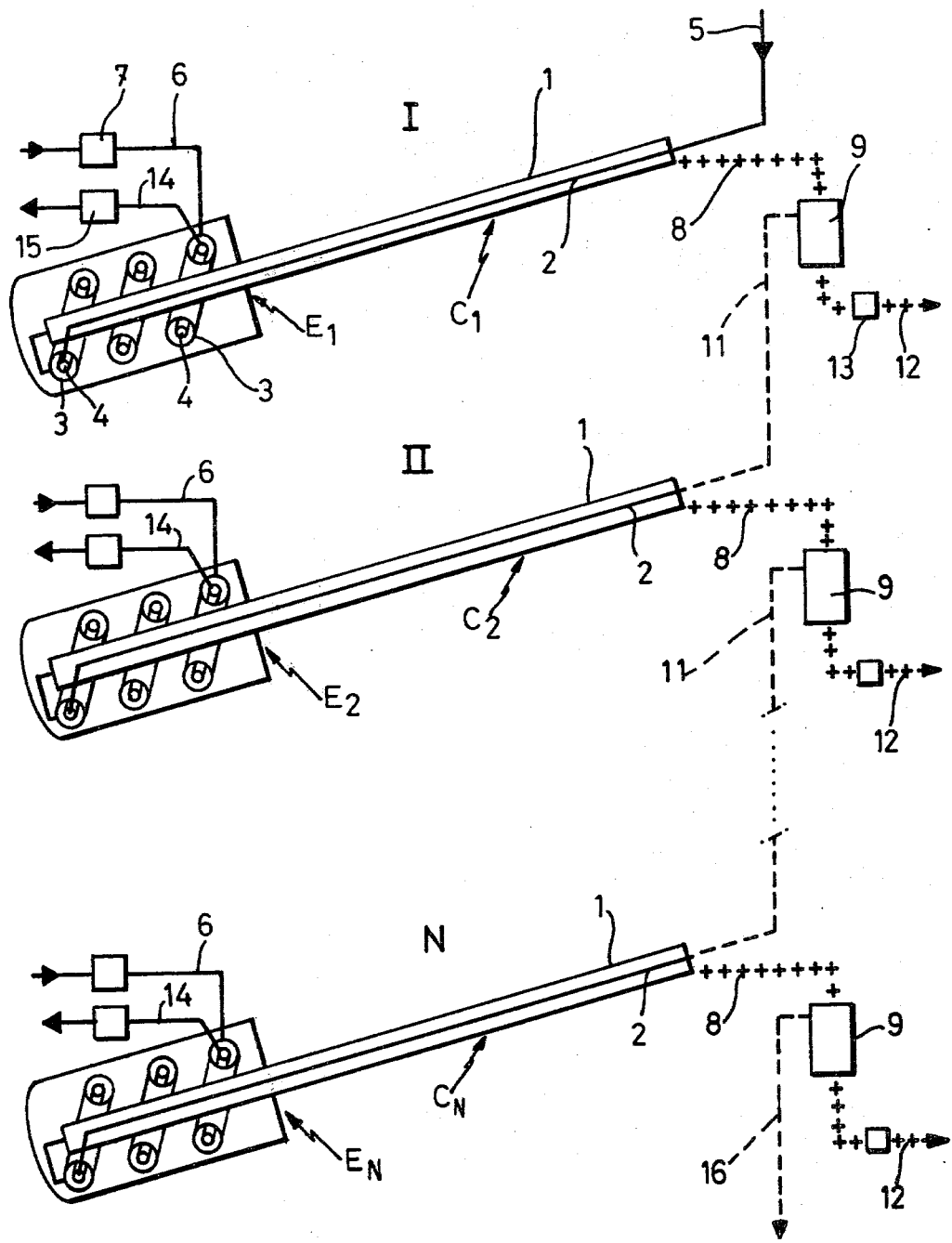

INSTALLATION FOR PURIFICATION OF A LIQUID COMPOUND

BACKGROUND OF THE INVENTION

The present invention relates to an installation for purification of a liquid, naturally or industrially charged with impurities, by multi-stage distillation.

Multi-stage distillation installations which are known comprise a certain number of heat exchanger stages connected in series, in which the fluid to be treated is subjected from stage to stage to an increasing concentration caused by successive heating or flash actions. These installations are relatively complex and offer little flexibility in the treatment of the residues produced, since the fluid supply is effected at the entry of the first stage. Moreover these installations involve a relatively great consumption of energy.

SUMMARY OF THE INVENTION

The invention has for its object the provision of a purification installation which offers a great flexibility in the treatment of the residues produced and which involves a relatively low energy consumption.

Another object of this invention is to provide a purification installation which permits recuperation of latent heat.

According to the invention there is provided a multi-stage installation for purification of a liquid compound in which a quantity of fluid is purified independently by distillation in each stage, with vaporisation of certain components thereof.

The installation comprises a number of distillation stages each comprising two heat exchangers connected in series and the same number of supply circuits for the compound to be treated, each connected to a distinct distillation stage. At the outlet of each distillation stage there is produced a polyphase mixture which is then separated into vaporised component(s) and sludges. The latters are evacuated for recuperation or destruction while the vaporised component(s) is used as heating fluid in the next following distillation stage.

A form of embodiment of the installation according to the invention is described by way of example hereinafter with reference to the accompanying single diagrammatic drawing.

DESCRIPTION OF THE DRAWING

The single FIGURE is a schematic diagram of a purification installation according to the invention, comprising N distillation stages.

DESCRIPTION OF AN EXEMPLARY EMBODIMENT

The installation as represented diagrammatically in the drawing comprises N identical distillation stages I, II, . . . N each constituted by two counter-current heat exchangers connected in series. The first exchanger C1 comprises a long tube 1 which is relatively slender in relation to its length and is disposed obliquely to the horizontal. This tube is connected so that a compound to be treated, constituted by a liquid containing a component or group of components capable of vaporisation under the action of heat, can travel lengthwise through the tube. The tube 1 contains at least one internal tube 2 connected so that a heating fluid circulating in counter-current with the compound to be treated can pass through it. The lower extremity of each of the tubes 1 and 2 is connected respectively to a first and a second circuit of the second heat exchanger E1 which serves as economiser exchanger. This second exchanger can be constituted for example by a long tube 3 containing one or more tubes 4 of smaller diameter. This exchanger can be rectilinear or advantageously wound in a coil around the first exchanger, as illustrated in the drawing. The second exchanger can likewise be a plate-type exchanger.

Let us consider the distillation stage I. The entry of the tube 2, that is to say its higher extremity, is connected by a conduit 5 to a heating fluid supply circuit. The lower extremity of the tube 2, that is to say its exit, is connected to the tube 4 of the economiser exchanger E1. The lower extremity of the tube 1 is connected to the tube 3 of the exchanger E1 and this tube 3 has its opposite extremity connected to a supply conduit 6 for compound to be treated. This conduit 6 is equipped with a flow regulating element 7.

In passing through the tube 2 the heating fluid is cooled by thermal exchange with the compound to be treated which is travelling through the external tube 1 and the substantially cooled heating fluid which leaves the tube 2 at its lower extremity then passes through the internal tube 4 of the economiser exchanger E1, in which it loses the balance of its calories to heat the compound to be treated circulating in the tube 3. The temperature of the heating fluid at the exit of the tube 2 is slightly higher than that necessary to cause vaporisation of the vaporisable component or group of components of the compound to be treated. In the course of its travel through the tube 1 the vaporised fraction of the compound to be treated increases continuously and therefore the polyphase mixture is subjected in the course of this travel to a significant acceleration which imparts to the mixture the speed essential for the entraining of the unvaporised components. For this purpose it is necessary that the tube 1 should be a long tube relatively slender in relation to its length so as to avoid the formation of a plane of separation between the vapour produced and the unvaporised fluid.

The polyphase mixture thus formed leaves the tube 1 through the conduit 8 which introduces it into a separator device 9. This device is arranged in a manner known per se to separate the produced vapour—that is to say the vaporised component or group of components—from the remainder of the liquid mixture. Thus it comprises an exit connected to a conduit 11 for the evacuation of the vapour and an exit connected to a conduit 12 for the evacuation of the liquid and sludges. An element 13 serving as separator is placed on the exit conduit 12. This conduit 12 conveys the sludges to concentration, recuperation, evacuation or destruction means (not shown). The conduit 11, that is to say the vapour conduit, is connected to the entry of the tube 2 of the exchanger C2 of the following distillation stage II in such manner that the vapour produced in the stage I serves as heating fluid in the exchanger C2.

At the exit of the economiser exchanger E1 the condensed and cooled liquid is evacuated through the conduit 14 equipped with a regulator 15 which directs it towards a possible utiliser at a temperature slightly higher than that of the compound to be treated introduced into the tube 3.

The distillation stage II, like the subsequent stages, is identical with the above-described stage I. Thus each stage receives a supply of compound for treatment separate from that of the other stages. In the last distillation stage N the vapour collected at the vapour exit 16 of the separator device can be directed to any utilisation.

The following distinctive points appear clearly from the foregoing description:

(a) Each stage is supplied separately with compound for treatment and each stage is the site of a continuously increasing concentration in impurity, without establishment of a plane of separation between the vapour and the fluid;

(b) The vapour produced in each stage, except the last, serves as heating fluid in the following stage;

(c) The installation permits recuperation of latent heat.

The economy of the installation according to the invention appears clearly from the following example. It will be assumed that it has been decided to reduce the temperature of the vapour by 10° C. per stage and that it is accepted that the cooled fluid should be evacuated through the conduit 14 at a temperature 10° C. above that of the compound introduced through the conduit 6. If the vapour discharged at the exit 16 of the last stage is reutilised, the only energy consumption consists in the enthalpy difference between entering vapour and issuing vapour, entering liquid and issuing liquid.

Assuming a vapour entering at 200° C. (enthalpy 667 kcal./kg.) and a vapour issuing at 190° C. (enthalpy 665 kcal./kg.), the consumption will be 1.6 kcal./kg.

As regards the distillation, assuming that the liquid is introduced at the temperature of 40° C. and thus that the liquid issues at the temperature of 50° C., there will be an enthalpy difference of 10 kcal./kg. and the distillation will consequently be effected for an energy expenditure of 11.6 kcal./kg. It is still possible to reduce this expenditure by reducing the difference between the temperature of the entering liquid and the temperature of the issuing liquid by the use of an appropriately dimensioned economiser exchanger.

In the above-described example the heating fluid is assumed to be a hot liquid introduced through the conduit 5. It is however clearly understood that the heating fluid can equally be a hot gas coming from a burner. In this case the compound to be treated will circulate in the internal tube or tubes of the exchanger C1 and the heating gas will circulate in the external tube which will constitute a combustion chamber equipped with a burner. The tube or tubes through which the compound to be purified passes will then advantageously be wound in a coil instead of being rectilinear as illustrated in the accompanying diagrammatic drawing.

What is claimed is:

1. An installation for the purification of at least one liquid compound, comprising a plurality of distillation stages, each distillation stage comprising:
   liquid compound feed means for parallel feeding to each and every of said stages;
   first preheater heat exchange means having a first inlet connected to said liquid compound feed means and having a first outlet for the preheated liquid compound, said first heat exchange means further having a second inlet connected to admit a heating fluid and having a second outlet for the cooled heating fluid;
   second distillate heat exchange means having a first inlet connected to the first outlet of said first preheater heat exchange means and having a first outlet for the distillate, said second heat exchange means further having a second inlet connected to admit heating fluid and having a second outlet connected to the second inlet of said first preheater heat exchange means;
   separator means having an inlet connected to the first outlet of said second distillate heat exchange means and further having a first outlet for vapor and a second outlet for the bottoms;
   means for conveying the vapor from the first outlet of said separator means to the second inlet of said second heat exchange means in the next distillate stage;
   first discharge means for discharging the bottoms from said second outlet of the separator means; and
   second discharge means for discharging the vapor from said first outlet of the separator means in the last distillation stage for utilization.

2. A purification installation according to claim 1, wherein the liquid compound introduced into the first inlet of said first preheater heat exchange means is of the same nature as said heating fluid introduced into the second inlet of said second distillate heat exchange means.

3. A purification installation according to claim 1, wherein the liquid compound introduced into the first inlet of said first preheater heat exchange means is of a different nature than said heating fluid introduced into the second inlet of said second distillate heat exchange means.

4. A purification installation according to claim 1, wherein said heating fluid introduced into said second distillate heat exchange means is a gas from a burner.

5. A purification installation according to claim 1, wherein said second distillate heat exchange means is constituted by a long first tube which is slender in relation to its length, said first tube being disposed obliquely to the horizontal and longitudinally containing at least one second tube, the lower end of said first tube forming said first inlet of said second heat exchange means and the upper end of said second tube forming said second inlet of said second heat exchange means with the lower end of said second tube forming said second outlet of said second heat exchange means.

6. A purification installation according to claim 5, wherein said first preheater heat exchange means comprises two concentric tubes wound in a coil around said second distillate heat exchange means.

7. A purification installation according to claim 6, in which said coil surrounds only the lower end of said second distillate heat exchange means.

8. A purification installation according to claim 1, wherein said first preheater heat exchange means comprises two concentric tubes wound in a coil around said second distillate heat exchange means.

9. A purification installation according to claim 1, in which said liquid compound in each said stage is of a different nature than said bottoms from the preceding said stage.

\* \* \* \* \*